United States Patent [19]
Fukuhara et al.

[11] 3,910,695
[45] Oct. 7, 1975

[54] AUTOMATIC FOCUS ADJUSTING DEVICE FOR USE IN INFORMATION RETRIEVING APPARATUS

[75] Inventors: Shigetomi Fukuhara, Chiba; Takakiyo Ito, Tokyo, both of Japan

[73] Assignee: Hitachi, Ltd., Japan

[22] Filed: Feb. 26, 1974

[21] Appl. No.: 445,917

[30] Foreign Application Priority Data
Feb. 28, 1973 Japan.............................. 48-23181

[52] U.S. Cl................................... 353/101; 353/27
[51] Int. Cl.² ...................... G03B 3/06; G03B 23/10
[58] Field of Search ......... 353/100, 101, 76, 27, 81; 352/140; 355/60, 55; 354/201

[56] References Cited
UNITED STATES PATENTS
2,178,228  10/1939  Goldsmith........................... 352/140
3,791,727   2/1974  Kleekamp............................ 353/101

Primary Examiner—Richard E. Aegerter
Assistant Examiner—A. Jason Mirabito
Attorney, Agent, or Firm—Craig & Antonelli

[57] ABSTRACT

A first and a second stationary reflecting member and a movable reflecting member are disposed between an information storing piece and an information retrieving lens so that light passing along the optical axis of the optical system can be focussed on the image bearing surface of the information storing piece. Means are provided as that, in response to a variation of the relative distance between the information storing piece and the lens, the movable reflecting member can also be moved to compensate for this variation of the relative distance for continually maintaining the predetermined focal distance.

10 Claims, 5 Drawing Figures

AUTOMATIC FOCUS ADJUSTING DEVICE FOR USE IN INFORMATION RETRIEVING APPARATUS

BACKGROUND OF THE INVENTION

1. Field of the Invention

This invention relates to an automatic focus adjusting device for use in an information retrieving apparatus which retrieves information from any desired information storing piece among many information storing pieces such as ultra-microfilms or ordinary microfilms.

2. Description of the Prior Art

In an information retrieving apparatus of the kind which retrieves information from information storing pieces which may be ultra-microfilms or ordinary microfilms, these information storing pieces are generally mounted on the outer peripheral surface of a drum type storage and maintained in position by means such as a pressure plate, and a projection lens for information retrieval is disposed at a predetermined position spaced apart from the information storing pieces so that the focus of the lens can be positioned on the image bearing surface of the desired piece from which information should be retrieved. However, means for adjusting the focus is inevitably required in such an apparatus for the reasons that the effect of retrieval cannot be appreciably enhanced even when the mechanical precision of the pressure plate is solely improved and that the depth of focus of the lens is shallow. Thus, a manual focus adjusting means is necessarily incorporated in the apparatus. However, a considerable length of time is required for adjusting the focus with such a manual means and the efficiency of retrieval is quite low.

SUMMARY OF THE INVENTION

It is a primary object of the present invention to provide, in an information retrieving apparatus having optical members and a drum mounting information storing pieces thereon, an automatic focus adjusting device which comprises means for adjusting instantaneously the optical path in response to a very slight variation of the position of the information storing piece hence the image bearing surface thereof rotating with the rotation of the drum, so that troublesome focus adjustment with the prior art manual adjusting means can be eliminated and the period of time required for information retrieval can be reduced to improve the efficiency of retrieval.

In summary, the present invention provides an automatic focus adjusting device for use in an information retrieving apparatus which comprises a first stationary reflecting member for reflecting light from an image carried by an information storing piece to direct the light in a direction perpendicular to the original direction, a movable reflecting member for reflecting the reflected light in a parallel but opposite direction, and a second stationary reflecting member for reflecting this reflected light in a direction opposite to the direction of reflection by the first stationary reflecting member. The reflecting members are disposed between the information storing piece and an information retrieving lens so that the light passing along the optical axis of the optical system can be focussed on the image bearing surface of the information storing piece. Means including a slider are provided so that, when the information storing piece moves even very slightly relative to the lens to vary the distance between the information storing piece and the lens, the movable reflecting member can be moved by a distance corresponding to the movement of the information storing piece thereby continually maintaining the predetermined focal distance.

DESCRIPTION OF THE PREFERRED EMBODIMENTS

Figure 1:
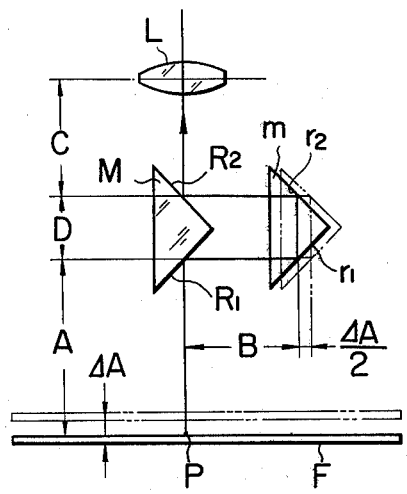
FIG. 1 shows diagrammatically the basic principle of an automatic focus adjusting device for use in an information retrieving apparatus according to the present invention.

Referring to FIG. 1 showing diagrammatically the basic principle of an automatic focus adjusting device for use in an information retrieving apparatus according to the present invention, a stationary reflecting means M comprises an integral combination of a first stationary reflecting member $R_1$ and a second stationary reflecting member $R_2$ which are disposed perpendicularly relative to each other. The first stationary reflecting member $R_1$ is disposed in such a position that an angle of about 45° is defined between it and an information storing piece F. A movable reflecting means m comprises an integral combination of a first movable reflecting member $r_1$ and a second movable reflecting member $r_2$ which are disposed perpendicularly relative to each other. The first movable reflecting member $r_1$ is disposed in parallel with the first stationary reflecting member $R_1$, and the second movable reflecting member $r_2$ is disposed in parallel with the second stationary reflecting member $R_2$. A convergent lens L has a focus on the image bearing surface P of the information storing piece F, and light is reflected along the optical path A-B-D-B-C. Thus, the focal distance f of the convergent lens L and the optical path A-B-D-B-C satisfy the relation $$f = A + 2B + D + C \quad (1)$$

Therefore when the information storing piece F moves by $\Delta A$ in the direction of the optical axis, for example, in the direction in which the optical path is reduced by $\Delta A$, the movable reflecting means m may be moved by $\Delta A/2$ toward the right in FIG. 1. In this case, the optical path is given by $$(A - \Delta A) + (B + \Delta A/2) \times 2 + D + C = A + 2B + D + C \quad (2)$$

and therefore the equation (1) can be satisfied always.

The present invention utilizes the basic principle above described and will now be described with reference to an embodiment shown in FIG. 2.

Figure 2:
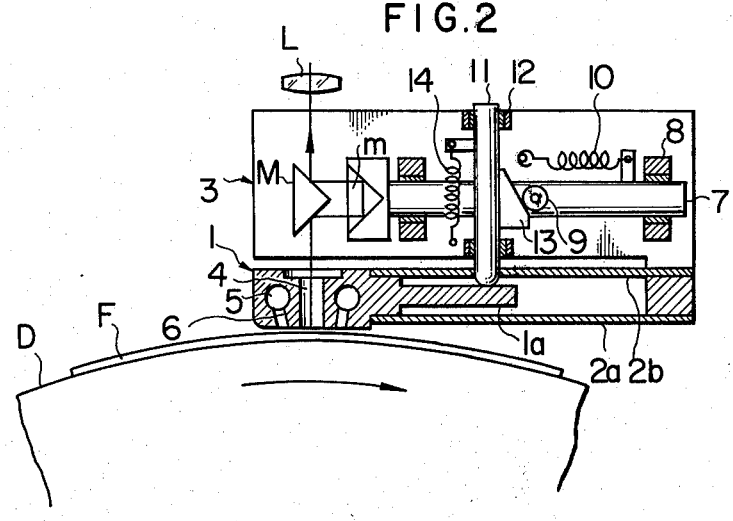
FIG. 2 is a schematic sectional view of an embodiment of the present invention utilizing the basic principle shown in FIG. 1.

Referring to FIG. 2, a slider 1 is provided with an arm 1a and is fixed to a housing 3 by a pair of parallel leaf springs 2a and 2b. An opening 4 is bored in the slider 1 in such a manner that the axis of the opening 4 coincides with the optical axis. A fluid supply passage 5 is formed in the slider 1 to communicate with a fluid discharge opening 6 which is located opposite to an information storing piece F mounted on a drum D. A shaft 7 is laterally slidably supported in the housing 3 by slide bearing means 8. A cam follower 9 is mounted on the laterally slidable shaft 7 in such a manner that it projects from a portion of the shaft 7. A spring 10 is anchored at opposite ends thereof to the housing 3 and laterally slidable shaft 7 respectively so as to normally bias the shaft 7 toward the left in FIG. 2. The stationary reflecting means M is fixed to the housing 3 at a position optically opposite to the opening 4 bored in the slider 1, and the movable reflecting means $m$ is mounted on the left-hand end of the laterally slidable shaft 7 at a position optically opposite to the stationary reflecting means M. The convergent lens L is disposed at such a position that it constitutes an optical system together with the stationary reflecting means M and movable reflecting means m. Another shaft 11 is longitudinally slidably supported in the housing 3 by slide bearing means 12. A cam 13 is fixed to the longitudinally slidable shaft 11 and its sloped cam surface is engaged by the cam follower 9. The inclination of the sloped cam surface of the cam 13 is suitably selected so that the laterally slidable shaft 7 can be moved by $\Delta A/2$ toward the right or left when the longitudinally slidable shaft 11 moves by $\Delta A$ upward or downward. A spring 14 is anchored at opposite ends thereof to the housing 3 and longitudinally slidable shaft 11 respectively so as to normally bias the shaft 11 downward.

In operation, fluid such as air under high pressure is discharged from the discharge opening 6 to force the information storing piece F into intimate contact with the drum D, while the slider 1 is urged away from the drum D by the reaction of air to define between it and the information storing piece F a gap which is proportional to the pressure of air discharged from the discharge opening 6. However, the predetermined gap may not be maintained and may be increased or decreased when, for example, the information storing piece F mounted on the drum D rotating in a direction shown by the arrow includes locally a hard and hardly bending portion and cannot be brought into intimate contact with the drum D in spite of the high pressure imparted thereto or when the thickness of the information storing piece F at one portion differs from that of another portion. However, as is commonly known, the variation of the air pressure resulting from the variation of the gap causes a corresponding variation of the relative position of the slider 1 thereby compensating for deviation of the gap from the predetermined value. Thus, the predetermined gap can be always maintained between the slider 1 and the information storing piece F. When the slider 1 makes vertical movement, that is, when the arm 1$a$ makes vertical movement while maintaining its horizontal position (although it makes slight horizontal movement), the longitudinally slidable shaft 11 makes corresponding vertical movement while following the vertical movement of the arm 1$a$. The cam 13 fixed to the shaft 11 acts to cause rightward or leftward movement of the cam follower 9 by an amount which is one-half of the amount of vertical movement of the shaft 11. Thus, the movable reflecting means m which is urged in either direction in interlocking relation with the slider 1 can be moved in the corresponding direction while satisfying always the equation (1).

Figure 3:
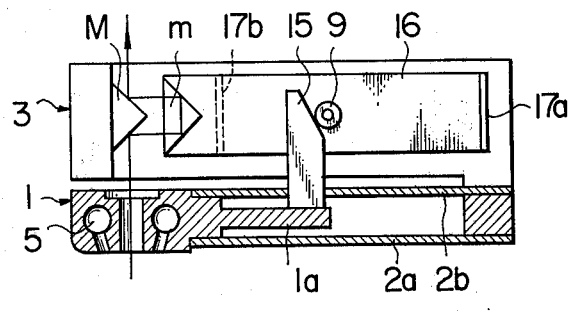
FIG. 3 is a schematic sectional view of another embodiment of the present invention.

FIG. 3 shows another embodiment of the present invention and like reference numerals are used to denote like parts appearing in FIG. 2.

Referring to FIG. 3, a cam 15 is vertically fixed to an arm 1$a$ of a slider 1 and is in engagement with a cam follower 9 which if fixed to a supporting member 16 supporting the movable reflecting means m thereon. The supporting member 16 is laterally movably supported in a housing 3 by a pair of parallel leaf springs 17$a$ and 17$b$ so that it can move in a direction parallel with the arm 1$a$. The leaf springs 17$a$ and 17$b$ act to ensure the engagement between the cam 15 and the cam follower 9. Thus, when the slider 1, hence the arm 1$a$, makes vertical movement (although it makes also slight horizontal movement), the supporting member 16 following the movement of the arm 1$a$ of the slider 1 can be moved toward the right or left by an amount which is one-half the amount of vertical movement of the slider 1. Any more detailed description of the operation is unnecessary as it is apparent from FIG. 3.

Figure 4:
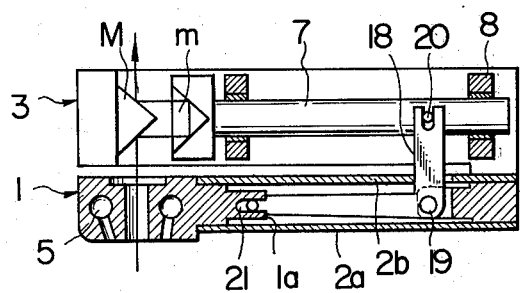
FIG. 4 is a schematic sectional view of still another embodiment of the present invention.

FIG. 4 shows still another embodiment of the present invention and like reference numerals are used to denote like parts appearing in FIG 2. Referring to FIG. 4, a link 18 is pivoted by a central portion thereof to a housing 3 by a pivot 19. One end of the link 18 is bifurcated to receive therein a pin 20 provided on a laterally slidable shaft 7, and the other end of the link 18 is provided with a pin which is received in a groove 21 formed in the end of an arm 1$a$ of a slider 1. Thus, when the slider 1, hence the arm 1$a$, makes vertical movement, the laterally slidable shaft 7 operatively connected to the arm 1$a$ of the slider 1 by the link 18 can be moved toward the right or left by an amount which is about one-half of the amount of the vertical movement of the slider 1. Any more detailed description of the operation is unnecessary as it is apparent from FIG. 4.

Figure 5:
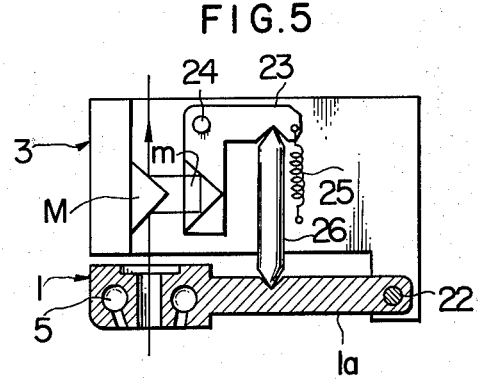
FIG. 5 is a schematic sectional view of yet another embodiment of the present invention.

FIG. 5 shows yet another embodiment of the present invention and like reference numerals are used to denote like parts appearing in FIG. 2.

Referring to FIG. 5, an arm 1a of a slider 1 is pivoted at the end thereof to a housing by a pivot 22, and an L-shaped supporting member 23 is pivoted to the housing 3 by a pivot 24. A spring 25 is anchored at opposite ends thereof to the housing 3 and one end of the L-shaped supporting member 23 respectively so as to normally bias the above-mentioned end of the L-shaped supporting member 23 downward. A link 26 is interposed between the L-shaped supporting member 23 and the arm 1$a$ of the slider 1 so as to normally bias the slider 1 downward. Thus, when the slider 1, hence the arm 1$a$, makes vertical movement, the L-shaped supporting member 23 swings around the pivot 24 by an amount which is about one-half of the amount of vertical movement of the slider 1. Any more detailed description of the operation is unnecessary as it is apparent from FIG. 5.

It will be understood from the foregoing description of the present invention that, even when the image bearing surface of the information storing piece F may be slightly shifted in the direction of the optical axis for the reasons that the information storing piece F includes locally a hard and hardly bending portion and cannot be brought into intimate contact with the drum D or when the thickness of one portion of the information storing piece F differs from that of another portion, the automatic focus adjusting device adjusts automatically and instantaneously the optical path length $(A + 2B + D + C)$ between the image bearing surface and the convergent lens L so that this optical path length can be maintained to be always eaual to the focal distance of the lens L. Thus, troublesome adjustment as by manual means is unnecessary and the period of time required for information retrieval can be reduced to improve the efficiency of information retrieval.

We claim:

1. An automatic focus adjusting device for use in an information retrieving apparatus comprising a projection lens for retrieving information stored in an information storing means, a first stationary reflecting means disposed between said information storing means and said projection lens for reflecting information bearing light from said information storing means in a direction perpendicular to the longitudinal axis of said lens, a movable reflecting means for reflecting said reflected information bearing light in a parallel but opposite direction, a second stationary reflecting means for further reflecting said reflected information bearing light in a direction perpendicular to the direction of reflection by said movable reflecting means, said first and second stationary reflecting means and said movable reflecting means being disposed in such a relation that the light passing along the optical axis of the optical system can be focussed on the information bearing surface of said information storing means, and means responsive to the movement of said information storing means toward or away from said lens in a direction parallel to the longitudinal axis of said lens to cause movement of said movable reflecting means away from or toward said first and second reflecting means in a direction perpendicular to the longitudinal axis of said lens by an amount which is one-half of the amount of movement of said information storing means relative to said lens, wherein said responsive means comprises a slider disposed in close proximity to said information storing means and provided with a fluid discharge opening opposite to said information storing means, said slider being urged away from or toward the information bearing surface of said information storing means by the pressure of fluid discharged from said fluid discharge opening so that said movable reflecting means can follow the movement of said slider and the focus of said lens can be positioned always on the information bearing surface of said information storing means.

2. An automatic focus adjusting device as claimed in claim 1, wherein said responsive means further comprises a longitudinally slidable shaft having a cam and engaging with said slider so as to move together with said slider by an amount equal to the amount of movement of said slider in a direction parallel to the longitudinal axis of said lens, a laterally slidable shaft having a cam follower engaged by said cam so as to move in a direction perpendicular to the direction of movement of said longitudinally slidable shaft while following the movement of said longitudinally slidable shaft, and a housing mounting said slider, said longitudinally slidable shaft and said laterally slidable shaft therein, said first and second stationary reflecting means being fixedly mounted in said housing, and said movable reflecting means being fixedly mounted on said laterally slidable shaft.

3. An automatic focus adjusting device as claimed in claim 1, wherein said responsive means further comprises a cam fixed to said slider, a supporting member having a cam follower engaged by said cam so as to move in a direction perpendicular to the direction of movement of said cam while following the movement of said cam, and a housing mounting said slider and said supporting member therein, said first and second stationary reflecting means being fixedly mounted in said housing, and said movable reflecting means being fixedly mounted on said supporting member.

4. An automatic focus adjusting device as claimed in claim 1, wherein said responsive means further comprises a link arranged for making swinging movement in response to the movement of said slider, a laterally slidable shaft arranged for making sliding movement in response to the swinging movement of said link, and a housing mounting said slider, said link and said laterally slidable shaft therein, said first and second stationary reflecting means being fixedly mounted in said housing, and said movable reflecting means being fixedly mounted on said laterally slidable shaft.

5. An automatic focus adjusting device as claimed in claim 1, wherein said responsive means further comprises a link arranged for movement in response to the movement of said slider, an L-shaped supporting member arranged for making swinging movement in response to the movement of said link, and a housing mounting said slider and said supporting member therein, said first and second stationary reflecting means being fixedly mounted in said housing, and said movable reflecting means being fixedly mounted on said L-shaped supporting member.

6. An automatic focus adjusting device for use in an information retrieving apparatus comprising a projection lens for retrieving the information stored in an information storing means, a first stationary reflecting means disposed between said information storing means and said projection lens for reflecting information bearing light, a movable reflecting means for reflecting said information bearing light reflected by said first stationary reflecting means, a second stationary reflecting means for further reflecting said information bearing light reflected by said movable reflecting means, said first and second stationary reflecting means and said movable reflecting means being disposed in such a relation that the light passing along the optical axis of the optical system can be focussed on the information bearing surface of said information storing means, and means responsive to movement of said information storing means toward said lens to cause movement of said movable reflecting means away from said first and second reflecting means by an amount which is one-half of the amount of movement of said information storing means relative to said projection lens, so that the focus of said projection lens can be positioned always on the information bearing surface of said information storing means, wherein said responsive means comprises a slider disposed in close proximity to said information storing means so as to be movable in parallel with the information bearing surface of said information storing means, said slider being provided with a fluid discharge opening opposite to said information storing means so that said slider is urged in parallel with the the information bearing surface of said information storing means by the pressure of fluid discharged from said fluid discharge opening and said movable reflecting means can follow movement of said slider.

7. An automatic focus adjusting device as claimed in claim 6 wherein said responsive means further comprises a first slidable shaft having a cam and engaging with said slider so as to move together with said slider by an amount equal to the amount of movement of said slider and a second slidable shaft having a cam follower engaged by said cam so as to move in a direction perpendicular to movement of said first slidable shaft while following movement of said first slidable shaft, and a housing mounting said slider, said first slidable shaft and said second slidable shaft therein, said first and second stationary reflecting means being firmly mounted in said housing, and said movable reflecting means being firmly mounted on said second slidable shaft.

8. An automatic focus adjusting device as claimed in claim 6, wherein said responsive means further comprises a cam firmly fixed to said slider, a supporting member having a cam follower engaged by said cam so as to move in a direction perpendicular to movement of said cam while following movement of said cam, and a housing mounting said slider and said supporting member therein, said first and second stationary reflecting means being firmly mounted in said housing, and said movable reflecting means being firmly mounted on said supporting member.

9. An automatic focus adjusting device as claimed in claim 6, wherein said responsive means further comprises a link arranged for making swinging movement in response to movement of said slider, said second slidable shaft arranged for making sliding movement in response to swinging movement of said link, and a housing mounting said slider, said link and said second slidable shaft therein, and first and second stationary reflecting means being firmly mounted in said housing, and said movable reflecting means being firmly mounted on said second slidable shaft.

10. An automatic focus adjusting device as claimed in claim 6, wherein said responsive means further comprises a link arranged for movement in response to the movement of said slider, an L-shaped supporting member arranged for making swinging movement in response to movement of said link, and a housing mounting said slider and said supporting member therein, said first and second stationary reflecting means being firmly mounted in said housing, and said movable reflecting means being firmly mounted on said L-shaped supporting member.

* * * * *